United States Patent [19]

Kispert et al.

[11] 4,174,870
[45] Nov. 20, 1979

[54] MULTI-PART ANTIFRICTION BEARING CAGE

[75] Inventors: Klaus Kispert; Werner Manger; Paul Weineck, all of Schweinfurt, Fed. Rep. of Germany

[73] Assignee: SKF Industrial Trading & Development Company B.V., Nieuwegein, Netherlands

[21] Appl. No.: 917,114

[22] Filed: Jun. 19, 1978

Related U.S. Application Data

[63] Continuation of Ser. No. 746,943, Dec. 2, 1976, abandoned.

[30] Foreign Application Priority Data

Dec. 12, 1975 [DE] Fed. Rep. of Germany ... 7539626[U]

[51] Int. Cl.² ............................................. F16C 33/46
[52] U.S. Cl. ................................. 308/217; 29/148.4 C
[58] Field of Search .................. 308/189 R, 195, 196, 308/201, 216, 217, 218, 235, 236; 29/148.4 R, 148.4 A, 148.4 C

[56] References Cited

U.S. PATENT DOCUMENTS

| 1,415,420 | 5/1922 | Weibull | 308/217 |
| 3,387,901 | 6/1968 | Williams | 308/217 |
| 3,944,307 | 3/1976 | Bingle | 308/217 |

*Primary Examiner*—Charles E. Frankfort
*Attorney, Agent, or Firm*—Daniel M. Rosen

[57] ABSTRACT

An antifriction bearing cage comprising a plurality of parts centered and secured radially with respect to one another and axially secured together, wherein one of the parts includes a plurality of webs, one side of each web being terminated in a common ring. The free ends of each web include one centering spigot, each spigot having a defined outer surface converging toward a pin arranged thereon, and the centering spigot having a greater cross-section than the pin, the other of the parts being a cover part on the side thereof pointing towards the first part, having an opening for receiving the pin, a portion of the opening having lateral walls dimensioned to be engaged by the centering spigot having a correspondingly defined outer surface.

13 Claims, 5 Drawing Figures

MULTI-PART ANTIFRICTION BEARING CAGE

This is a continuation of application Ser. No. 746,943, filed Dec. 2, 1976, and now abandoned.

BACKGROUND OF THE INVENTION

The present invention relates to an antifriction bearing cage, and particularly to a bearing cage having two or more parts riveted together, one of the parts having rivet spigots or pins formed in one piece with the supporting webs.

It has been known for some time to form rivet spigots or pins in one piece with the webs of antifriction bearings as, for example, in concealed-collar cages or in cages combining intermediate web portions and lateral discs. In cages of the latter type, it has been known to provide race webs designed to accommodate lateral discs with axial recesses. These known types of cages, however, have the disadvantage of being relatively expensive to manufacture because the cage parts must be machined to relatively close tolerances.

Finally, it is also part of the state of the art to provide cam-shaped recesses on the lateral discs of concealed-collar cages and to fit the web ends into these recesses. Manufacturing costs for this type of cage, however, are also relatively high.

It is therefore the principal object of the present invention to provide an antifriction bearing cage of the unitary construction type, with a construction of relatively inexpensive manufactured parts which are uniquely and securely fastened to one another.

It is another object of the present invention to provide a unique unitary web and rivet construction which may be easily and securely fastened to a cover disc with a minimum of radial stress.

SUMMARY OF THE INVENTION

The foregoing objects are achieved in accordance with the invention by providing one centering spigot or projection at the free ends of the webs, each centering projection having a riveting pin arranged thereon. The centering projection has a larger cross-section than the riveting pin and the cover disc or similar device, on the side pointing towards the webs, has a bore with converging sidewalls into which the centering projections engage by means of corresponding centering surfaces. According to a further characteristic of the invention, the greatest width of the bore arranged in the cover disc is slightly smaller than the greatest radial distance of the centering projections.

BRIEF DESCRIPTION OF THE DRAWINGS

The foregoing brief description of the present invention will become more apparent from the following more detailed description and appended drawings, wherein.

DETAILED DESCRIPTION OF A PREFERRED EMBODIMENT

Figure 1:
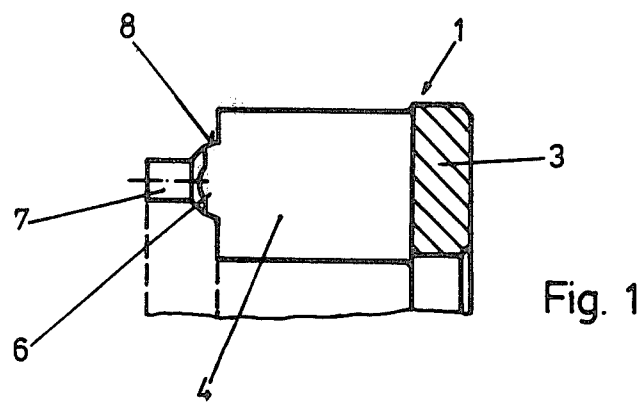
FIG. 1 illustrates a cross-sectional view of the cage in accordance with the invention having centering projections and riveting pins formed on the web ends.
Figure 2:
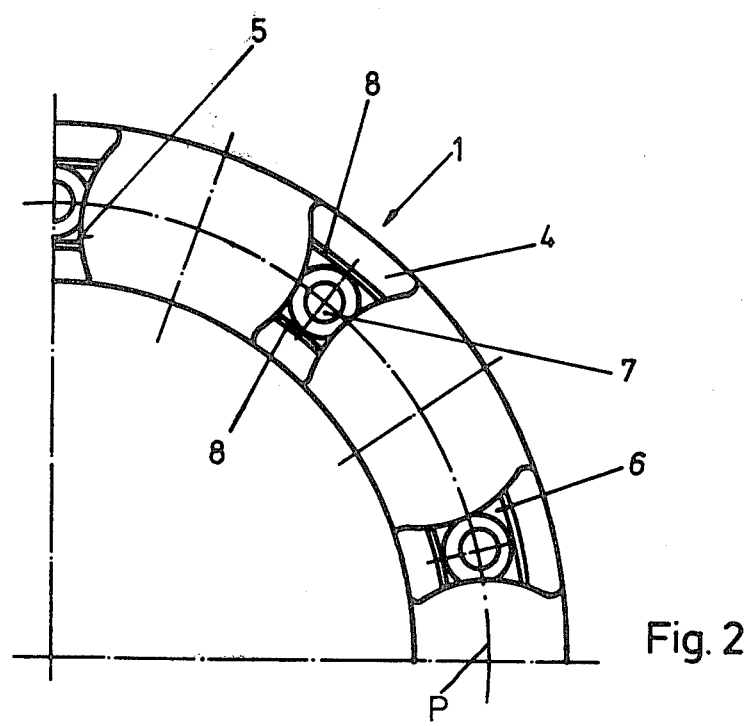
FIG. 2 shows a part of the lateral view of the comb shaped part according to FIG. 1, seen from the left.

The cage, as shown in FIGS. 1 through 5, consists of a comb shaped part 1 and a cover disc 2. The comb shaped part 1, shown in FIG. 1, has a lateral ring 3 and webs 4, and is provided with pocket walls 5. The pocket walls 5 have a convex design corresponding to the shape of rolling elements such as balls or rollers (not shown here). At the free ends of each of the webs 4 of the crest 1 there is one centering spigot 6. On each spigot 6 there is a riveting pin 7, the centering projection 6 having a greater cross-section than the riveting pin 7. The centering surfaces 8 defining the centering projection 6 have been arranged above and below the pitch line P (FIG. 2) and have the shape of a circular surface.

Figure 3:
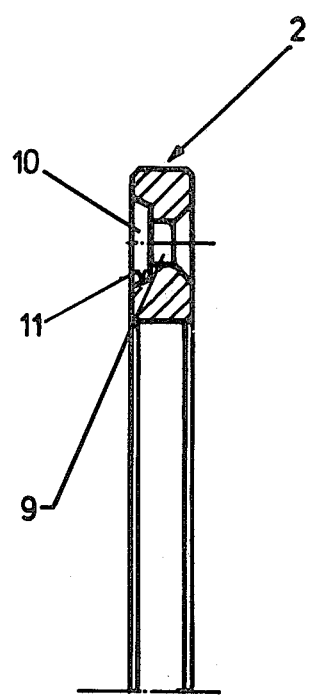
FIG. 3 illustrates, in a sectional view, the cover disc of the cage, in accordance with the invention.
Figure 4:
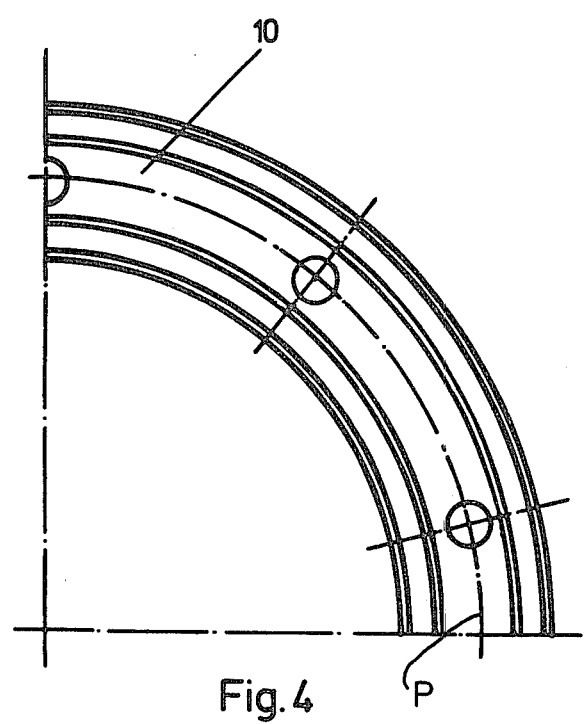
FIG. 4 shows a left-hand view of a portion of the lateral part of the cover disc.
Figure 5:
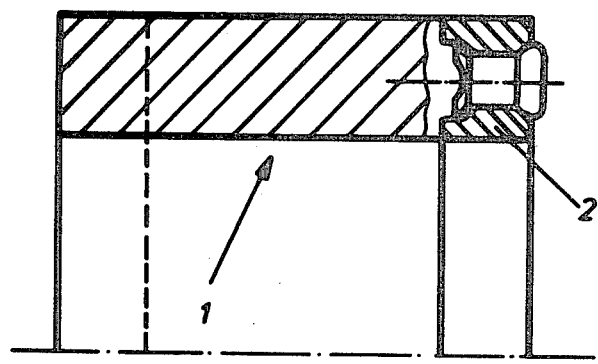
FIG. 5 illustrates a sectional view of the cage with its cover disc riveted on, in accordance with the invention.

The cover disc 2 has been provided with bores 9 shown, for example, in FIG. 3, to accommodate rivet pins 7. The bores 9, on the side of the disc 2 pointing toward comb shaped part 1, each widen into a recess 10 with slanted side walls 11, the inclination of which corresponds with that of the centering surfaces 8 on the centering projections 6. As a result, the greatest diameter of the recess 10 is slightly smaller than the greatest radial projection of the centering projections 6, so that the cover disc 2 must be forced onto the centering projections 6. This will assure a radially firm fit of the cover disc 2 on the comb shaped part 1, so that the riveting operation need fix the cover disc 2 only in axial position.

The radial forces of mass acting on the cage, resulting in shear and bending stress, thus only act on the centering projections 6 of the webs 4, which have relatively strong cross-sections, and not on the rivet pins 7. Centering surfaces 8, during rough-turning of the comb shaped part 1, are made as part of the rough-turning process and thus are generated practically automatically. As a result, manufacturing costs for the cage are relatively low. As material for the cage a metal, such as brass, or a synthetic such as plastic, can be used.

The embodiment herein described constitutes only one example of the cage according to the invention. Changes in the design of the individual components are easily possible within the framework, spirit and scope of the invention. Thus, for example, the present invention is not limited to concealed-collar cages but can also be used advantageously for cages consisting of lateral discs and intermediate webs.

What is claimed is:

1. An antifriction bearing cage comprising a plurality of parts centered and secured radially with respect to one another and axially secured together, wherein one of said parts includes a plurality of webs, one end of each web terminating in a common ring, the other ends of each web including one centering projection, each projection having a first defined outer surface converging toward a pin arranged thereon, said centering projection having a greater cross-section than said pin, another of said parts being a cover part, said cover part, on the side thereof pointing towards said first part, having an annular recess for receiving said centering projections, the portion of said recess facing said web having converging lateral walls dimensioned to be engaged by said centering projections, and a plurality of openings in said cover part for receiving said pins.

2. The antifriction bearing cage of claim 1, wherein the greatest diameter of said cover part recess is slightly smaller than the greatest radial dimension of said centering projections.

3. The antifriction bearing cage of claim 1, wherein said pin is a rivet, said rivet being secured onto the end of said cover part opening remote from said one of said parts.

4. The antifriction bearing cage of claim 1, wherein said one and cover parts are secured together against axial stress by riveting, said pins constituting rivets, said one and cover parts being secured radially at the contact surfaces formed by said first defined outer surface of said centering projections and said lateral walls of said annular recess of said cover part.

5. The antifriction bearing cage of claim 4, wherein said first defined outer surface has an outwardly converging shape, and said lateral walls have a corresponding inwardly inclined shape.

6. The antifriction bearing cage of claim 1, wherein said first defined outer surface is convex.

7. The antifriction bearing cage of claim 1, wherein said first defined outer surface is circular, and said lateral walls are inclined to the axis of said cage.

8. The antifriction bearing cage of claim 7, wherein the greatest diameter of said recess is less than the greatest radial spacing of said first defined outer surfaces.

9. In a rolling bearing cage having a first side ring, a plurality of spaced apart cross pieces extending laterally from said first side ring, said cross pieces having free ends away from said first side ring and rivet pins extending axially from said free ends, and a second side ring on said free ends, to define a plurality of pockets for rolling elements, said rivet pins extending through bores in said second side ring and aligned therewith; the improvement wherein said free ends have centering projections from which said rivet pins extend, said centering projections have greater transverse cross sections than said rivet pins and having longitudinal cross sections that converge toward said rivet pins, said second side ring having an annular recess on the side thereof facing said first side ring, said recess having slanted side walls to engage the converging surfaces of said centering projections.

10. The rolling bearing cage of claim 9, wherein said centering projections have substantially circular transverse cross sections throughout their extent.

11. The rolling bearing cage of claim 9, wherein said first side ring and spaced apart cross pieces are a unitary comb shaped structure.

12. The rolling bearing cage of claim 9 wherein said recess has radially inner and outer lateral walls which engage radially inner and outer portions of the surfaces of said centering projections respectively.

13. The rolling bearing cage of claim 9 wherein said boxes extend into said recess.

* * * * *

UNITED STATES PATENT AND TRADEMARK OFFICE
CERTIFICATE OF CORRECTION

PATENT NO. : 4,174,870
DATED : November 20, 1979
INVENTOR(S) : Klaus Kispert, et al It is certified that error appears in the above-identified patent and that said Letters Patent are hereby corrected as shown below:

Column 4, line 27, Change "boxes" to --bores--.

Signed and Sealed this

Seventeenth Day of June 1980

[SEAL]

Attest:

SIDNEY A. DIAMOND

Attesting Officer

Commissioner of Patents and Trademarks